United States Patent [19]

Göllner et al.

[11] Patent Number: 5,442,951

[45] Date of Patent: Aug. 22, 1995

[54] DEVICE FOR TESTING PIPES FOR INTERIOR LEAKS

[75] Inventors: Erwin Göllner, Oberpframmern; Horst Hütter, Tegernsee, both of Germany

[73] Assignee: Deutsche Aerospace AG, Germany

[21] Appl. No.: 238,824

[22] Filed: May 6, 1994

[30] Foreign Application Priority Data

May 6, 1993 [DE] Germany .................. 43 14 995.2

[51] Int. Cl.⁶ .................................................. G01M 3/28
[52] U.S. Cl. ................................. 73/40.5 R; 15/104.05; 254/134.6
[58] Field of Search ............. 73/40.5 P, 40.5 R; 15/104.05, 104.31; 254/134.6

[56] References Cited

U.S. PATENT DOCUMENTS

| 3,224,734 | 12/1965 | Hill | 15/104.05 |
| 3,322,394 | 5/1967 | Gagne | 254/134.6 |
| 4,372,161 | 2/1983 | de Buda et al. | 254/134.6 |
| 4,558,751 | 12/1985 | Huffaker | 15/104.05 |

Primary Examiner—Hezron E. Williams
Assistant Examiner—Michael J. Brock
Attorney, Agent, or Firm—Evenson, McKeown, Edwards & Lenahan

[57] ABSTRACT

An arrangement for examining pipes for interior leaks, comprises two mirror-inverted sections, each having at least one clamping device and at least one pair of runners. A pneumatic pressure source is provided for inspection of the pipes, as well as a sealing arrangement and a control arrangement. Each section has an outer cylinder, at least one intermediate cylinder concentrically disposed in the outer cylinder and displaceable with respect thereto, and at least one inner cylinder concentrically disposed in the center cylinder and displaceable with respect thereto. The two inner cylinders of the two sections are connected with the pneumatic pressure source so that pneumatic energy for the internal-pressure test is also for used to move the two sections.

9 Claims, 3 Drawing Sheets

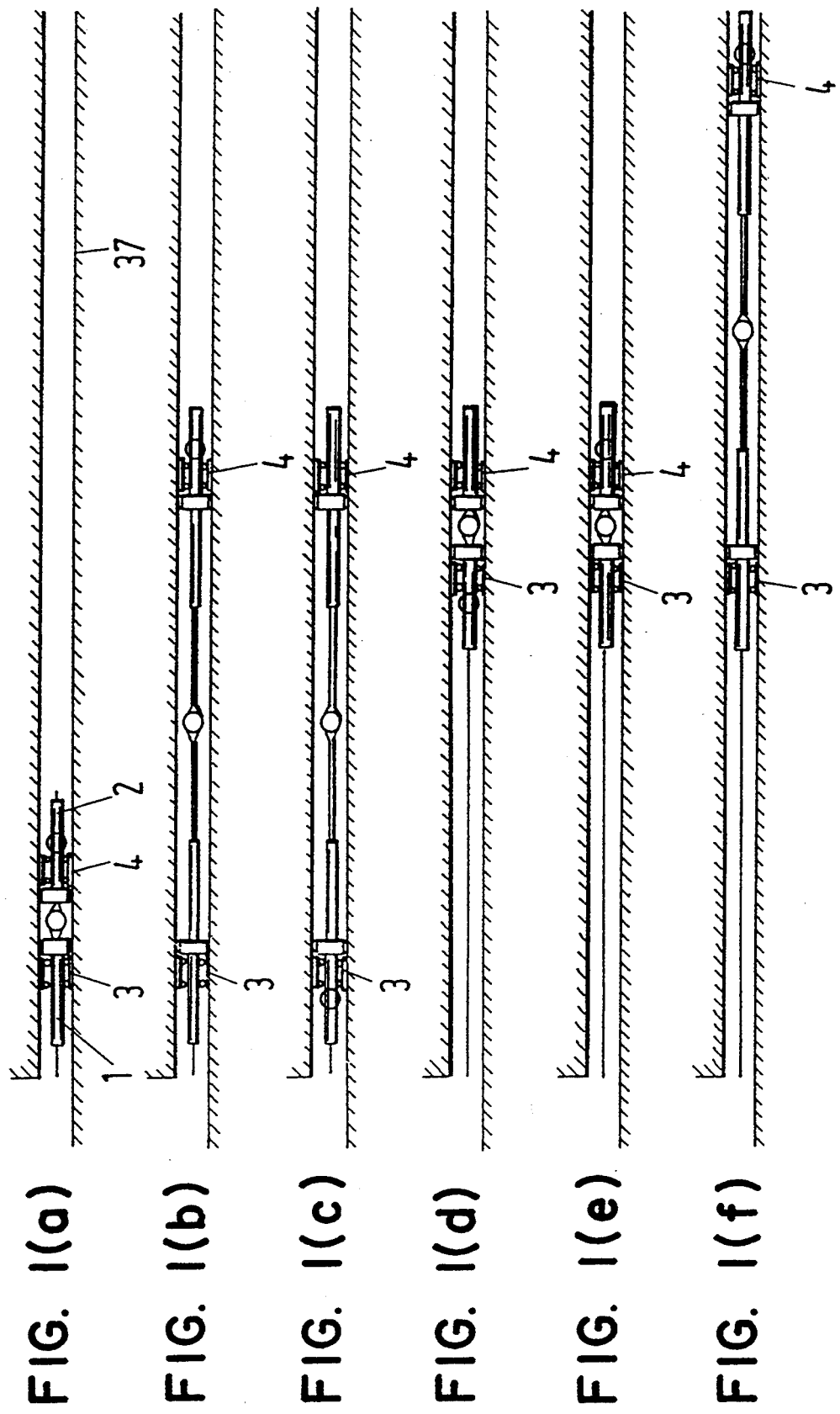

DEVICE FOR TESTING PIPES FOR INTERIOR LEAKS

BACKGROUND OF THE INVENTION

This invention relates to a movable arrangement for inspecting pipes to detect interior leaks, having two mirror-inverted sections, each with at least one clamping device and at least one pair of runners, a pneumatic pressure fluid source, an inspection arrangement and a control arrangement.

Arrangements of this type are required for testing pipes, such as drinking-water pipes, pipelines or sewage pipes which are otherwise not accessible and are, for example, dug into the ground. By means of an inspection device, such as a television camera with the pertaining lighting, the interior walls of the pipes may be examined for damage. Possible leaks may also be detected by the fact that, after an advance within the pipe, an arrangement temporarily seals off a portion of the pipe to be inspected so that this portion can be subjected to an increased pressure, and a pressure drop during a preset time points to a leakage in the pipe. In order to be able to test longer pipes, it is necessary to move the arrangement forward inside the pipe in each case by a preset distance, and then to seal off a new portion of the pipe for a specified time period. Also, to examine pipes of different diameters by means of a single arrangement, different distances must be bridged and possibly sealed off between the outer circumference of the arrangement and the interior wall of the pipe.

To inspect the pipe without omitting gaps, precise positioning of the arrangement and a precisely controlled advance and position indication are essential, especially to facilitate easy later location of determined leak points by a corresponding repair device.

It is an object of the invention to provide a movable arrangement for testing the interior of pipes, which can be precisely positioned at any point, has a simple construction and permits smooth advance, independent of the load.

This and other objects and advantages are achieved by the inspection arrangement according to the invention, which comprises two sections, each having an outer cylinder, a disposable intermediate cylinder arranged concentrically in the outer cylinder, and a displaceable inner cylinder which is concentrically arranged in the intermediate cylinder. The two inner cylinders of the two sections are connected with a common pneumatic pressure fluid source, and each section is also connected with a hydraulic switching circuit.

The movable testing arrangement according to the invention offers the advantage that the pneumatic energy provided by the pneumatic pressure source which is used to check pipes for leaks can also used to advance the two sections, which can be moved relative to one another. Since the two sections are connected with separate, but identical, hydraulic switching circuits, movements of the center and inner cylinders disposed in the outer cylinder can be controlled sensitively and without jolts. As a result, a moving speed is achieved which is almost independent of the load.

Other objects, advantages and novel features of the present invention will become apparent from the following detailed description of the invention when considered in conjunction with the accompanying drawings.

BRIEF DESCRIPTION OF THE DRAWINGS

FIGS. 1a to 1f are views of various positions of the arrangement according to the invention when used for inspecting a pipe.

DETAILED DESCRIPTION OF THE DRAWINGS

Figure 2A:
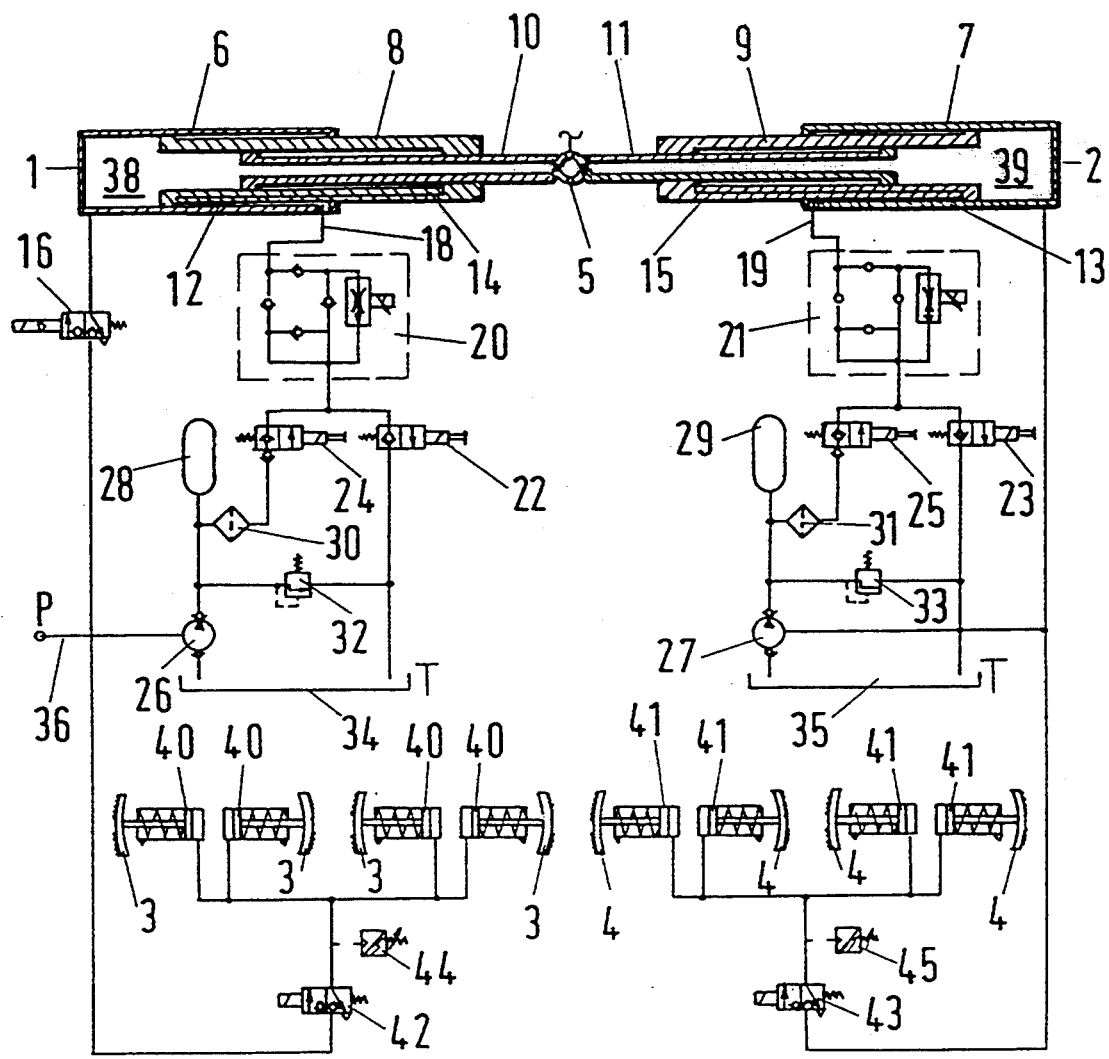
FIG. 2A is a schematic sectional view of the arrangement according to the invention together with connection diagrams of the pertaining hydraulic switching circuits.

FIG. 1 illustrates the progression of a movable arrangement according to the invention for inspecting the interior of an underground pipe 37 for leaks. As shown in FIG. 1a, the arrangement is introduced into the end of the pipe 37 to be checked. It comprises two sections 1, 2 which are mirror-inverted with respect to one another, each section being provided with a clamping device, such as radially movable expansion cheeks 3, 4 (FIG. 2) which are capable of temporarily clamping the pertaining section 1 or 2 to the interior wall of the pipe. FIG. 1a shows that section 1 is fixed on the interior wall of the pipe 37 because of the extended expansion cheeks, whereas section 2 can be displaced together with the retracted expansion cheeks 4. (See also, FIG. 3.)

In FIG. 1b, section 2 is displaced relative to the clamped-in section 3. For this purpose, the two sections 1, 2 are actuated by a pneumatic pressure fluid source (not shown) arranged, for example, on a vehicle, and connected with the arrangement 1, 2 via corresponding pressure lines, as shown in FIGS. 2 and 3. After section 2 has also been fixed by extending the radially movable expansion cheeks 4, and sealing devices 50, 51, such as an expansion bellows (FIG. 3) arranged on the exterior sides of the two sections 1, 2, have sealed off the section of pipe 37 which is situated between them, the integrity of the intervening pipe section can be tested by applying pressure from the pressure source, as indicated in FIG. 1c.

After the pressure is checked, the expansion cheeks 3 of section 1 are retracted, while the cheeks 4 of section 2 remain extended, and section 1 is pulled along by the action of pressure from the pressure source, as indicated in FIG. 1d.

As shown in FIG. 1e, the expansion cheeks 3 of section 1 are now extended so that it is clamped to the interior wall of the pipe 37, while the expansion cheeks 4 of section 2 are retracted, so that section 2 can be moved along another distance in the longitudinal direction of the pipe, as illustrated in FIG. 1f. After expansion cheek 4 is clamped again and the corresponding sealing devices are extended, the next section of pipe 37, which adjoins the first measured section, can now be checked for tightness. This process is repeated until the entire area of interest has been checked.

The construction details of sections 1 and 2 are shown in FIG. 3, in which the left sealing bellows 50 is shown in an extended (sealing) position and the right sealing bellows 51 is retracted. Similarly, the left radially movable expansion cheek 3 is shown in the extended position, so that the left section 1 is held in position relative to the pipe 37, while the expansion cheek 4 of section 2 is retracted, allowing it to move longitudinally within the pipe 37 on runners 57. Each section 1, 2 is equipped with a motion sensor 52, 53 connected to a cable 54, 55.

Figure 2B:
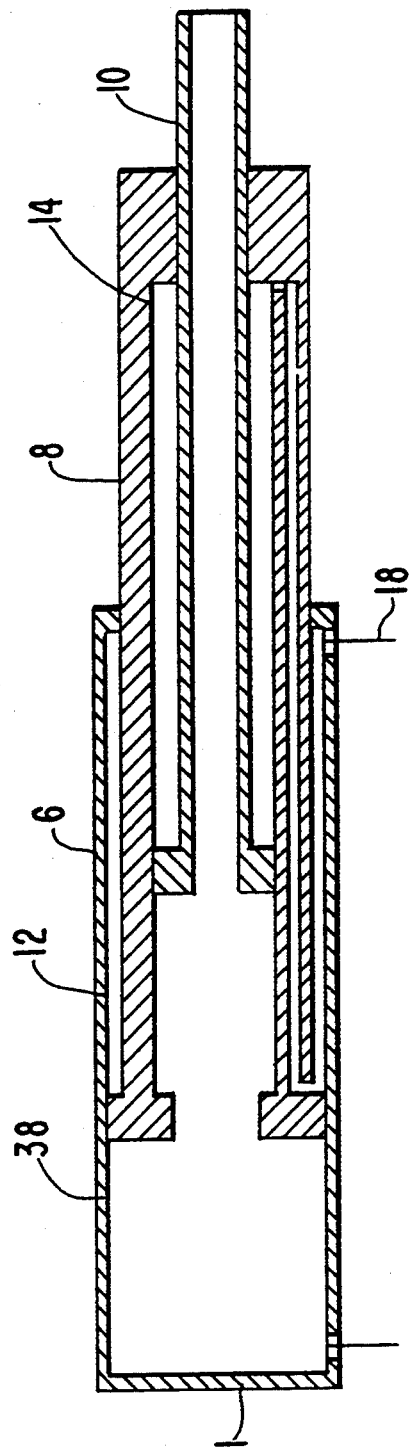
FIG. 2B is an enlarged cross-sectional view of one of the pneumatically actuated sections of FIG. 2A.
Figure 3:
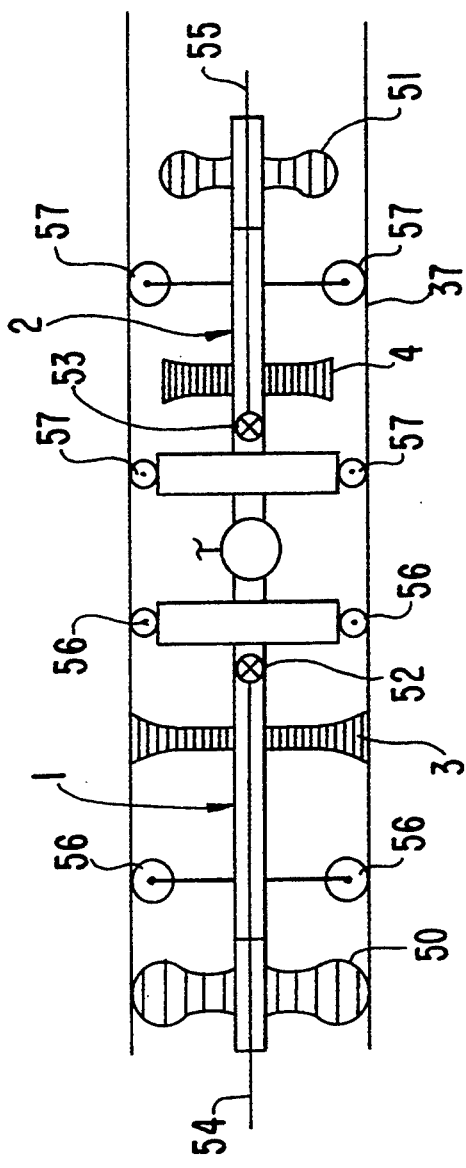
FIG. 3 is a more detailed sectional view of the arrangement according to the invention, shown schematically in FIG. 1.

FIG. 2A shows a sectional view of the arrangement according to the invention, with the two sections 1, 2 which are arranged mirror-inverted relative to one another (without the pertaining clamping devices and runners), and also includes a schematic view of the additional hydraulic switching circuit connected with each section 1, 2. FIG. 2B is an enlarged sectional view which shows the construction of the pneumatically operated section in FIG. 2A.

The two identically constructed sections 1, 2 each have an outer cylinder 6, 7, an intermediate cylinder 8, 9 which is displaceably disposed in the outer cylinder, and a concentric inner cylinder 10, 11 which is displaceably disposed in the intermediate cylinder. Via a connection piece 5, the two inner cylinders 10, 11 of the two sections 1, 2 are connected with one another as well as with a common pneumatic pressure source P which actuates each of the sections 1, 2 by means of compressed air.

As best shown in FIGS. 2A and 2B, the inner cylinder 10, 11 of each section 1, 2 is surrounded by an annular space 14, 15 between it and the interior wall of the intermediate cylinder 8, 9, and similarly the intermediate cylinder 8, 9 of each section 1, 2 is surrounded by an annular space 12, 13 between it and the interior wall of the outer cylinder 6, 7. The longitudinal dimension of these annuli determine the maximum relative longitudinal displacement between the sections 1, 2. In a practical embodiment, each annulus 12, 14; 13, 15 has a length of 600 mm, so that the maximum extension of the intermediate inner cylinders of each section relative to the outer cylinder amounts to 1,200 mm; thus, when both sections 1, 2 extend both cylinders at the same time, a total displacement path of 2,400 mm can be achieved.

The inner annuli 14, 15 of sections 1, 2 are connected with the outer annuli 12, 13 via a fluid line, and the outer annuli 12, 13, in turn, are connected with hydraulic switching circuits via a corresponding line 18, 19.

The sections 1, 2 of the arrangement according to the invention are also called a hydropneumatic duplex telescope cylinder arrangement (DTA). Because the two pressure chambers 38, 39 in the two sections 1, 2 are jointly acted upon by pressure from the pneumatic pressure source, in each instance the side that is not clamped to the interior of the pipe 37 is moved, at twice the relative speed of the displaceable cylinders within each side of the DTA. Moreover, by reversing the operating sequence, as described in connection with FIGS. 1a to 1f, both forward and backward movement of the DTA can be achieved. The extension of the expansion cylinders 40, 41 is performed pneumatically and is controlled via the electropneumatic expansion cylinder control valves 42, 43. Valve 42 is connected with the compressed-air source 36, and supplies valve 43 via the pressure chambers 38 and 39. The admission of pressure to the expansion cylinders 40, 41 is electrically actuated by the push switch 44, 45.

Advantageously, an electric motion sensor 52, 53, such as a cable pull potentiometer (FIG. 3) is installed in each of the two sections 1, 2 to measure the actual position of the extendable center and inner cylinders relative to the outer cylinder. In this manner, by means of an electric desired-value presetting input, for example, through a joystick, the relative distance between the two sections of the DTA can be controlled. Positioning and path measurement within a section of pipe 37 which is longer than the maximal displacement of the DTA is performed by electrically adding the individual movements which were carried out.

As noted previously, extension of the inner and intermediate cylinders in the two sections 1, 2 of the DTA is performed pneumatically under control of the electropneumatic advance control valve 16 illustrated in FIG. 2, which admits pressure to the piston-side pressure chambers 38, 39 connected with one another and with the pressure fluid source via the connection piece 5. Gradual control of the movement speed of the cylinders and hence a smooth, virtually load-independent damping of their displacement, is performed hydraulically by means of the hydraulic switching circuit for both sections 1, 2 shown in FIG. 2, via the proportional electrohydraulic flow control valve 20, 21 arranged on the outflow side and connected via a hydraulic line 18, 19 with the pertaining outer annulus 12, 13 of the two sections 1, 2. The flow control valve 20, 21 has the so-called Graetz-Circuit construction, which means that hydraulic fluid always flows through the actual valve itself in the same direction, regardless of whether the fluid flows through the line 18, 19 to the annulus 12, 13 or away from it. As a result of the pressure balance regulator integrated in the current regulating valve, movement of the inner cylinders 10, 11 as well as of the center cylinders 8, 9 takes place at a speed which is virtually independent of the load. The flow of hydraulic fluid (hydraulic oil, for example) into the hydraulic reservoirs 34, 35, is controlled by electrohydraulic 2/2-way outflow control valves 22, 23.

Retracting of the respective movable cylinders of the two sections 1, 2 of the DTA is performed hydraulically via the application of pressure separately to the two annuli 12, 14 and 13, 15 of each section 1, 2 via the hydraulic switching circuit. Because of the significantly smaller effective piston ring surfaces which are thus acted upon to drive the inner cylinders 10, 11 and the center cylinders 8, 9 only a low oil volume but a higher hydraulic pressure is required for the retraction (FIG. 1d) than for extension. This hydraulic pressure is generated by hydropneumatic high-pressure generators 26, 27 (which may be, for example, a compressed-air driven hydraulic pump, with an internal pneumohydraulic pressure intensification). The high-pressure generators 26, 27 are connected on one side with the respective reservoirs 34, 35 and, on the other side, with the pneumatic pressure fluid sources P via the connection 36, and with a damping accumulator 28, 29. As a result of the compressed air drive and the elimination of electric control elements, such a hydropneumatic high-pressure transducer, for example, in the form of a compressed-air driven hydraulic pump, is particularly suitable for applications in an environment subject to explosion risks.

Because of the high pneumohydraulic pressure ratio of, for example, 8:1 (corresponding to a pressure $P_{air}$ of 10 bar and a pressure of $P_{hydraulic}$ of 80 bar), a large retraction force can be implemented in the DTA, which is necessary to pull long supply lines through the pipe, while at the same time, the necessary oil volume is low, despite the compact construction. Movement is initiated by the electrohydraulic 2/2-way inflow control valve 24, 25 which is arranged in parallel to the electrohydraulic 2/2-way outflow control valve 22, 23 in the hydraulic switching circuit. The retracting speed of the two sections 1, 2 of the DTA is controlled on the inflow side via the proportional electro-hydraulic current regulating valve 20, 21. The arrangement of the four return valves in this current regulating valve (that is, the so-called Graetz Circuit), causes the flow through the valve body always to take place in the same flow direction.

In each hydraulic switching circuit, reference numbers 30, 31 each indicate a filter sieve, and reference numbers 32, 33 indicate a safety valve, which is designed, for example, for 100 bar. The compressed-air chambers 38, 39 in the two sections 1, 2 are vented during the retraction by the electropneumatic advance control valve 16 which, in turn is connected with the pneumatic compressed-air supply P.

A significant advantage of the arrangement according to the invention is that the pneumatic energy required for examining the pipes 37 for leakages can also be used for the pressureless, hydropneumatic advancement movement of the DTA.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A movable arrangement for examining interior of pipes, comprising:
    first and second sections coupled together in mirror-inverted relationship and mutually displaceable relative to each other;
    each of said first and second sections having at least one clamping element for clamping said section at a position in said pipe, and at least one actuator for causing relative movement between said first and second sections;
    each of said actuators of said first and second sections comprising outer, intermediate and inner concentric telescoping cylinders and having a pneumatic pressure chamber for causing said intermediate and inner cylinders to extend longitudinally relative to said outer cylinder, causing relative movement between said first and second sections;
    a pneumatic pressure source coupled to said pneumatic pressure chambers of said first and second sections;
    pressure control elements for controlling application of pressure to said pneumatic pressure chambers;
    a sealing arrangement for sealing off a portion of said pipe between said first and second section;
    means for testing said sealed portion of said pipe;
    a hydraulic unit for controlling relative movement of said intermediate and inner cylinders during extension thereof and for causing longitudinal retraction of said intermediate cylinders.

2. Arrangement according to claim 1 wherein said at least one clamping element of said first and second sections each comprise radially movable expansion cheeks distributed along a circumference of said section.

3. Arrangement according to claim 2 wherein said at least one clamping element of said first and second sections is pneumatically driven and is interruptibly coupled to receive pneumatic pressure from said pneumatic pressure source.

4. Arrangement according to claim 3 wherein said hydraulic unit comprises first and second annuli between said outer cylinder and said intermediate cylinder and between said intermediate cylinder and said inner cylinder respectively, said first and second annuli being hydraulically coupled to each other and to a hydraulic switching circuit.

5. Arrangement according to claim 4, wherein the hydraulic switching circuit comprises a proportional electrohydraulic flow control valve with a Graetz-Circuit, an electrohydraulic 2/2-way outflow control valve, connected behind the current regulating valve, an electrohydraulic 2/2 inflow control valve which is connected in parallel to the 2/2-way outflow control valve, a damping accumulator and a hydropneumatic high-pressure generator.

6. An arrangement according to claim 5, wherein the hydropneumatic high-pressure generator is a compressed-air-driven hydraulic pump connected with the pneumatic pressure fluid source.

7. An arrangement according to claim 6, wherein each section is provided with an electric motion sensor which measures position of the displaceable inner and center cylinders relative to the outer cylinder.

8. An arrangement according to claim 7, wherein the electric motion sensor is a cable pull potentiometer.

9. Arrangement according to claim 1 wherein said means for testing comprises means for applying pressure from said pneumatic pressure source to said sealed off portion of said pipe.

* * * * *